MEANS AND APPARATUS FOR CASTING INTERCELL CONNECTIONS FOR BATTERIES

Original Filed May 2, 1966

INVENTORS
KENNETH G. McGOWAN
& CHARLES H. McALPINE

D. Henry Stoltenberg
ATTORNEY

INVENTOR.
KENNETH G. McGOWAN
& CHARLES H. McALPINE
D Henry Stoltenberg
ATTORNEY

June 2, 1970 C. H. McALPINE ET AL 3,515,204

MEANS AND APPARATUS FOR CASTING INTERCELL CONNECTIONS FOR BATTERIES

Original Filed May 2, 1966 13 Sheets-Sheet 3

INVENTOR.
KENNETH G. McGOWAN
& CHARLES H. McALPINE
D Henry Stoltenberg
ATTORNEY

INVENTOR.
KENNETH G. McGOWAN
& CHARLES H. McALPINE
D. Henry Stoltenberg
ATTORNEY INVENTOR.
KENNETH G. McGOWAN
& CHARLES H. McALPINE
D Henry Stoltenberg
ATTORNEY June 2, 1970 C. H. McALPINE ET AL 3,515,204

MEANS AND APPARATUS FOR CASTING INTERCELL CONNECTIONS FOR BATTERIES

Original Filed May 2, 1966 13 Sheets-Sheet 6

INVENTORS
KENNETH G. McGOWAN
& CHARLES H. McALPINE
D. Henry Stoltenberg
ATTORNEY INVENTOR.
KENNETH G. McGOWAN
& CHARLES H. McALPINE
D. Henry Stoltenberg
ATTORNEY INVENTOR.
KENNETH G. McGOWAN
& CHARLES H. McALPINE
D. Henry Stoltenberg
ATTORNEY June 2, 1970 C. H. McALPINE ET AL 3,515,204

MEANS AND APPARATUS FOR CASTING INTERCELL CONNECTIONS FOR BATTERIES

Original Filed May 2, 1966 13 Sheets-Sheet 9

INVENTORS
KENNETH G. McGOWAN
& CHARLES H. McALPINE

D. Henry Stoltenberg

ATTORNEY

INVENTOR.
KENNETH G. McGOWAN
& CHARLES H. Mc ALPINE
D Henry Stoltenberg
ATTORNEY INVENTOR.
KENNETH G. Mc GOWAN
& CHARLES H. McALPINE
D Henry Stoltenberg
ATTORNEY INVENTORS
KENNETH G. McGOWAN
& CHARLES H. McALPINE
D. Henry Stoltenberg
ATTORNEY INVENTORS
KENNETH G. McGOWAN
& CHARLES H. McALPINE
ATTORNEY United States Patent Office 3,515,204
Patented June 2, 1970

3,515,204

MEANS AND APPARATUS FOR CASTING INTERCELL CONNECTIONS FOR BATTERIES

Charles H. McAlpine, Coloma, and Kenneth G. McGowan, Lawrence, Mich., assignors to MAC Engineering and Equipment Company, Benton Harbor, Mich., a corporation of Michigan Original application May 2, 1966, Ser. No. 546,717, now Patent No. 3,444,920, dated May 20, 1969. Divided and this application Sept. 10, 1968, Ser. No. 798,211
Int. Cl. B22d *17/24, 19/00*
U.S. Cl. 164—334 10 Claims

ABSTRACT OF THE DISCLOSURE

An apparatus for simultaneous casting of battery posts, lug straps, and intercell connectors onto the lugs of a plurality of battery plates to form a complete battery unit.

This application is a division of my copending application Ser. No. 546,717 filed May 2, 1966, now Pat. No. 3,444,920 issued May 20, 1969.

This invention relates to improvements in method and means for casting intercell connections for batteries.

The general practice in the art of manufacutring batteries with reference to the effecting of an intercell connection, has been to solder precast connectors and posts to the lugs of battery plates, while held in proper arrangement with respect to each other and with respect to intervening plate separators. This practice requires the use of combs and spacers and metal confining dams to control the flow of metal after heating and during the soldering operation. A post stand or positioner is used to hold the precast parts in correct relationship to straps which are formed by fusion of the plate lugs and metal added by the operator. Also it is usual in such instances for the operator to form a bead around the base of a precast part to effect a union of the plates and the precast portion.

A number of problems and difficulties attend the manufacture of batteries in this manner. Thus it is necessary that a large stock of precast posts, connectors and combs be available. Also this method requires the use of hand labor resulting in a slow rate of production and a high production cost.

Some efforts have been made to cast posts onto the the lugs of battery plates, but such efforts have met with only limited success and have been accompanied by difficulties which have prevented widespread adoption of such practice.

It is the primary object of this invention to provide a method and apparatus by means of which battery posts and intercell conectors can be cast upon and effectively electrically connected to battery plates at lugs thereof.

A further object is to provide a method and means for producing batteries with the use of minimum labor and at low cost by rapidly and accurately producing the batteries in a manner requiring use of a minimum number of preformed parts.

A further object is to provide a device of this character having a novel casting mold, novel means for clamping or carrying groups of interleaved battery plates and separators, novel means for aligning the lugs of groups of battery plates, and novel means for effecting transfer of the clamped parts from one position to another in selected groupings for casting parts to form an electrically connected assembly and for delivering the assembly to a discharge station.

A further object is to provide a device of this character having novel means for filling a battery mold cavity with a predetermined quantity of molten metal in a manner to insure that the metal is free of dross.

A further object is to provide a device of this character having novel means for holding the plates and separators insertable in a battery cell in properly oriented groups and for holding the groups in proper relation to each other during the operations of molding intercell connector straps and terminal posts in proper electrical connection with selected battery plates and while delivering the resultant assembly to a discharge station.

A further object is to provide a device for molding battery intercell connectors having a novel mold in which core members are shiftable to facilitate accurate molding of connectors between cells in a shape to accommodate fitting of the connectors over partitions between cells in the battery case.

Other objects will be apparent from the following specification.

Figure 27:
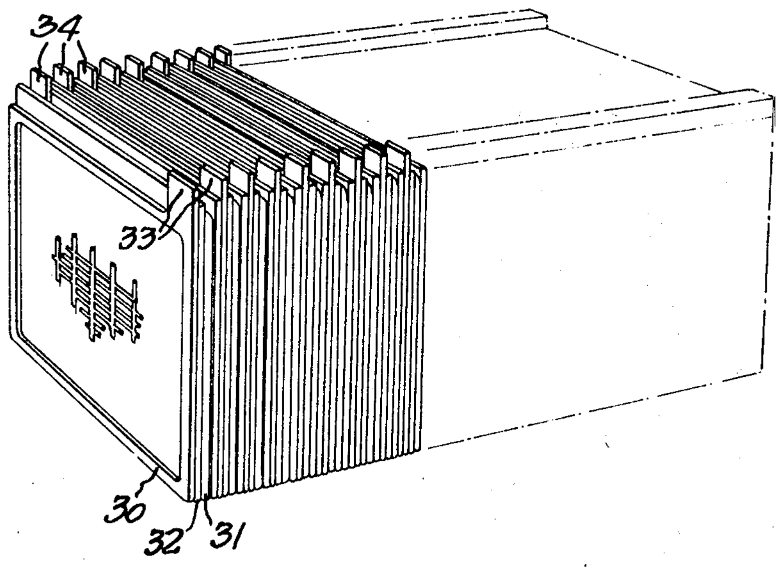
FIG. 27 is a fragmentary perspective view illustrating the grouping of battery plates and separators as held by the clamping carrier.

In the practice of the method, battery plates and separators are first assembled in a group or stack in the manner illustrated in FIG. 27, wherein positive plates 30 and negative plates 31 are arranged in alternate relation in a group, with adjacent plates 30 and 31 being separated by intervening separator sheets 32. The lugs 33 of positive plates 30 are aligned at one side of the group or stack, and lugs 34 of negative plates 31 are aligned at the opposite side of the stack or group. Such grouping and lug alignment of the plates and separators is the first step of the method which also includes a proper arrangement of all of the groups required to fill the various cells of the battery casing of the particular battery to be produced.

In the next step of the method, the properly arranged groups of plates and separators are clamped firmly to hold them in required position and relation to one another, and then are moved or advanced to a molding or casting station at which they are positioned with the respective rows of lugs projecting downwardly.

Figure 28:
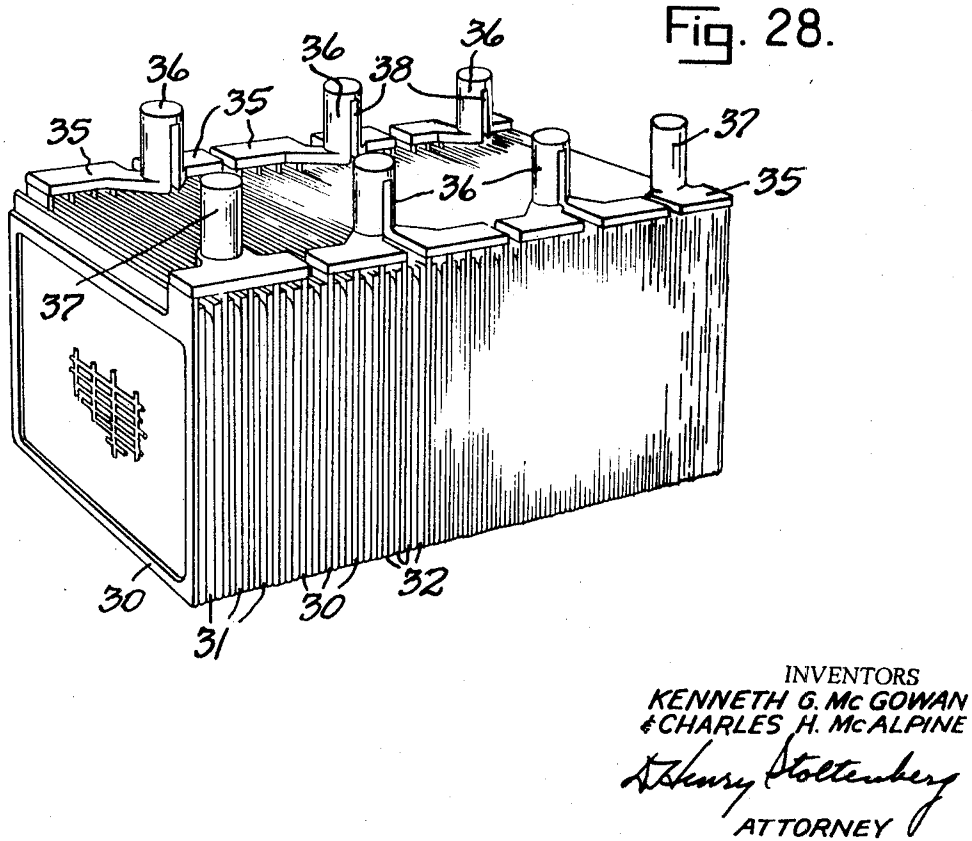
FIG. 28 is a perspective view of the plate and separator and intercall connector assembly, as produced by the device for insertion into a battery casing.

In the third step of the method, the lugs are immersed in molten lead within intercell connector strap forming mold cavities, that is, in the mold cavities for forming the straps 35 connecting plates of the same polarity in one or a pair of groups of plates. The mold also includes cavities for arched interconnecting means 36 between straps 35 joined to plates in adjacent cells and for terminal posts 37, all as illustrated in FIG. 28. The interconnecting means or posts 36 are molded around core members to define therein slots 38 which are adapted to fit upon or straddle the partitions of a battery case defining the various cells of the battery.

The next step of the method, following solidification of the metal in the mold, entails the withdrawal of the cores for forming the slots 38 and the release of the cast or molded parts from the mold cavities.

The final step of the method is the delivery of the plate sets or groups with their molded interconnectors and posts to the battery casing in which they are to be inserted.

By following the steps outlined, it is possible to assemble and manufacture battery plate assemblies or inserts with assured quality of electrical connections between the plates of the same and adjacent cells at the straps and other parts of the intercell connectors. It is also possible by this method to accomplish the fusion of the battery plate lugs and the connector straps by the use of conventional fluxes applied to the lugs.

An alternative step in the method which may be practiced to secure assured electrical connection of the lugs and molded straps is to introduce the lugs into the molten metal in a mold cavity to a selected depth, followed immediately by withdrawal to lesser depth. Thus an initial immersion to an extent of $\frac{1}{32}$ or $\frac{1}{16}$ of an inch greater than the final desired immersion has been found advantageous. The function of this action of immersion beyond desired depth, followed by partial withdrawal, is to produce a meniscus around each battery lug resulting from the surface tension of the lead, which meniscus is maintained as the lead solidifies, thus forming a slight bead at the surface of the strap surrounding each lug.

One apparatus for performing the method above described has been illustrated. This apparatus has a rigid frame 40 including side plates or members 41 and end members 42 and a shelf or platform 43 adjacent the operator's station at the left as viewed in FIGS. 1 and 2.

Figure 3:
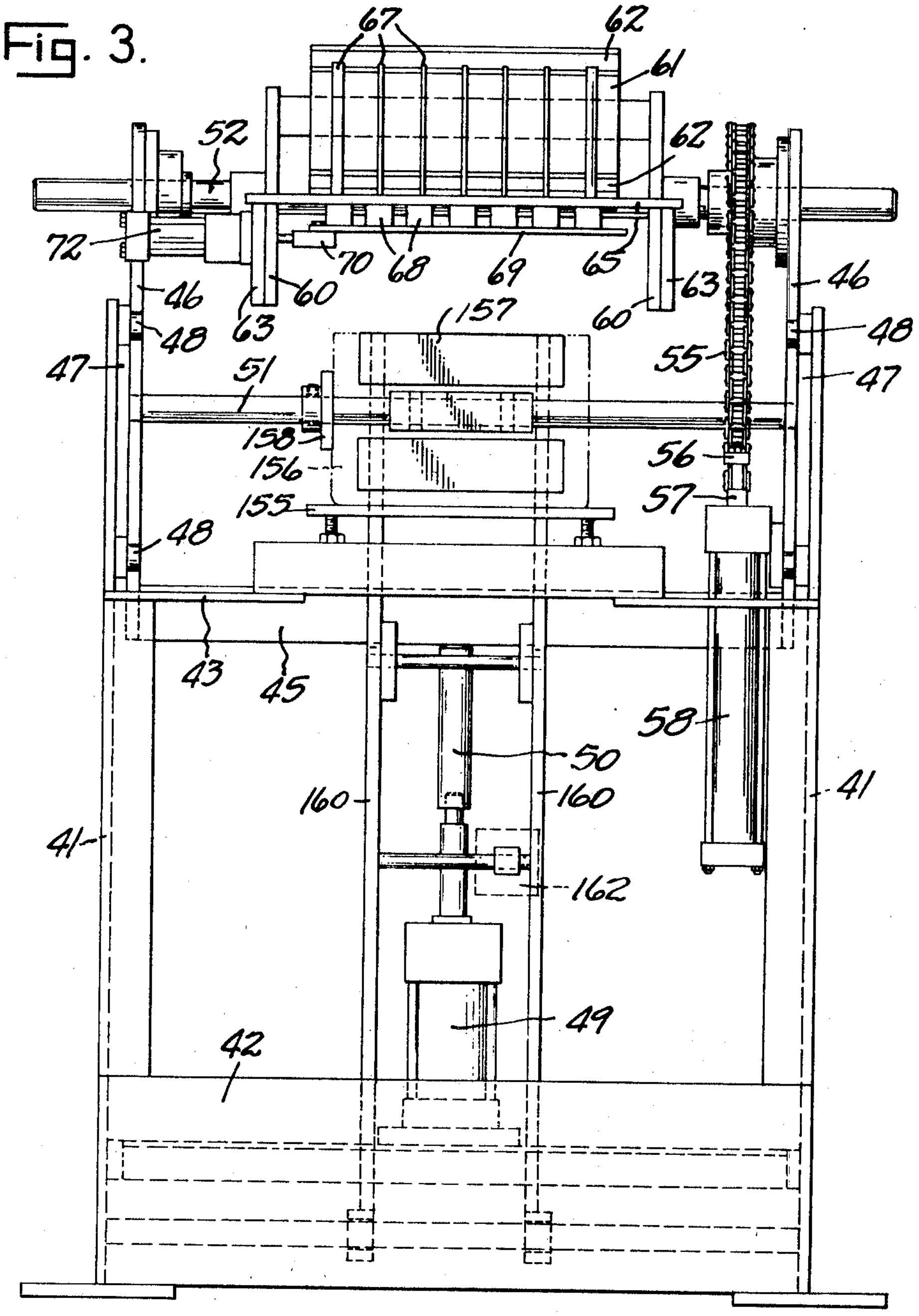
FIG. 3 is an end view of the apparatus as viewed from the left in FIG. 2.
Figure 23:
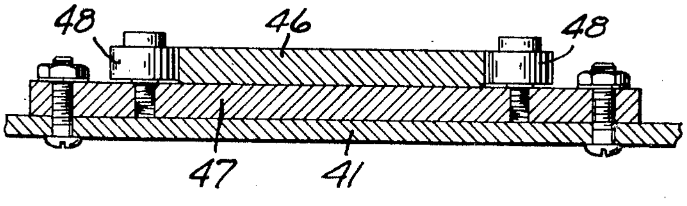
FIG. 23 is an enlarged detailed sectional view taken on line 23—23 of FIG. 22.

Intermediate the length of the frame and inwardly from the shelf 43 is located a vertically shiftable clamp carrier 45 having a pair of vertical plates or parts 46 adjacent the frame side plates 41 and guided by plates 47 carried by frame side plates 41 and by rollers 48 carried by guide plates 47, as illustrated in FIGS. 3 and 23. Suitable means are provided for adjusting the vertical position of the clamp carrier, such means being here illustrated as a fluid pressure operated unit or power member having a cylinder 49 mounted upon a suitable support at the lower part of the frame and having a piston rod 50 connected with the lower part of the clamp carrier 45.

A lower transverse shaft 51 is supported and journaled by the vertical carrier plates 46 and an upper transverse shaft 52 is supported and journaled by the carrier plates 46, preferably above the level of the top of the frame side plates 41. Shaft 51 mounts a sprocket 53 and shaft 52 mounts a sprocket 54. A chain 55 is trained around said sprockets. A lug 56 is carried by chain 55 and has connected thereto the piston rod 57 of a fluid pressure power member having a cylinder 58 supported by the carrier 45, 46. Operation of the power member 58 full stroke moves the chain 55 and rocks the sprockets 53 and 54 through a desired extent or angle for the respective required operations of the carrier.

A pair of L-shaped members 60 (see FIG. 9) are fixedly mounted upon the upper shaft 52 in spaced relation and are interconnected by an aligning plate 61, said aligning plate having a pair of spaced longitudinally extending lug-aligning grooves 62 formed therein. Members 60 and 61 normally assume the position illustrated in FIGS. 2 and 3 and dotted lines in FIG. 9, when the loading operation commences.

Figures 5, 6, 7:
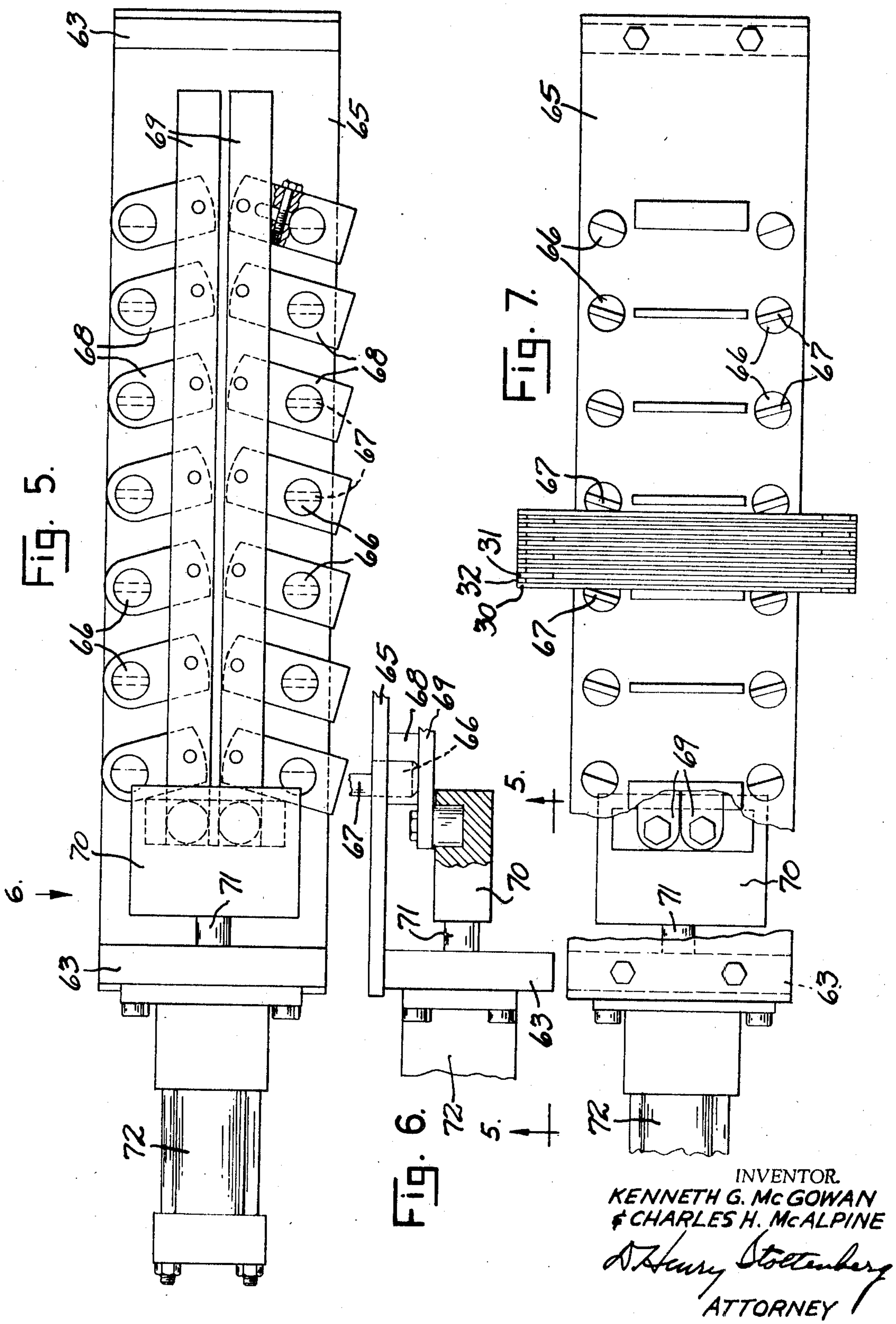
FIG. 5 is a bottom plan view of battery plate clamping apparatus utilized in the device as seen in the direction of arrows 5 in FIG. 6.
FIG. 6 is a fragmentary side view of the plate clamping apparatus as viewed from the top in FIG. 5, with parts shown in section.
FIG. 7 is a top plan view of the clamping apparatus in plate-clamping position, with parts broken away.

Brackets 63 are pivoted at 64 to the free ends of L-shaped members 60 opposite the ends which carry the aligning plate 61. Clamp means are mounted upon the bracket 63 and include a plate or support 65 connecting the brackets 63. Two sets of rotatable clamp pins 66 are journaled in the plates 65, each set extending in longitudinal alignment adjacent a margin of the plate 65. Each pin 66 is traversely paired with a pin in the other set, and each pin has a shoulder thereof terminating flush with or below the surface of plate 65 which is uppermost during the loading operation. A longitudinal upward projecting pin portion 67 projects above the upper surface of the plate 65, each said projection 67 being of non-circular cross-section. Thus each part 67 may have at least one flat surface and is of a length substantially equal to the width of battery plates 30, 31. The pin projections 67 in each row are so spaced that when the flat surfaces of paired pins in the two rows are parallel a stack or group of plates 30, 31 and separator sheets 32 may be interposed freely therebetween, i.e., when the parts are positioned as illustrated in FIG. 5. The pin projections 67 upon rotation to the FIG. 7 position serve to clamp and grip the stack of plates and separators.

The pins 66 are rotated by any suitable means and, as here illustrated in FIGS. 5–7, at the lower end thereof each pin fixedly carries a lever 68 which is pivotally connected at its free end to one of a pair of bars 69. Bars 69 are pivotally connected at one end to a cross-head 70, in turn connected to the piston rod 71 of a power member or actuator, here shown as the cylinder 72 carried by one of the brackets 63. The power member 72 is preferably a double-acting pneumatic or hydraulic cylinder capable of shifting the bars 69 endwise to swing the levers 68 and rock the clamp pins 66 and their pin projections 67 between the release position shown in dotted lines in FIG. 5 and the clamping position shown in full lines in FIG. 7.

Figures 1, 2:
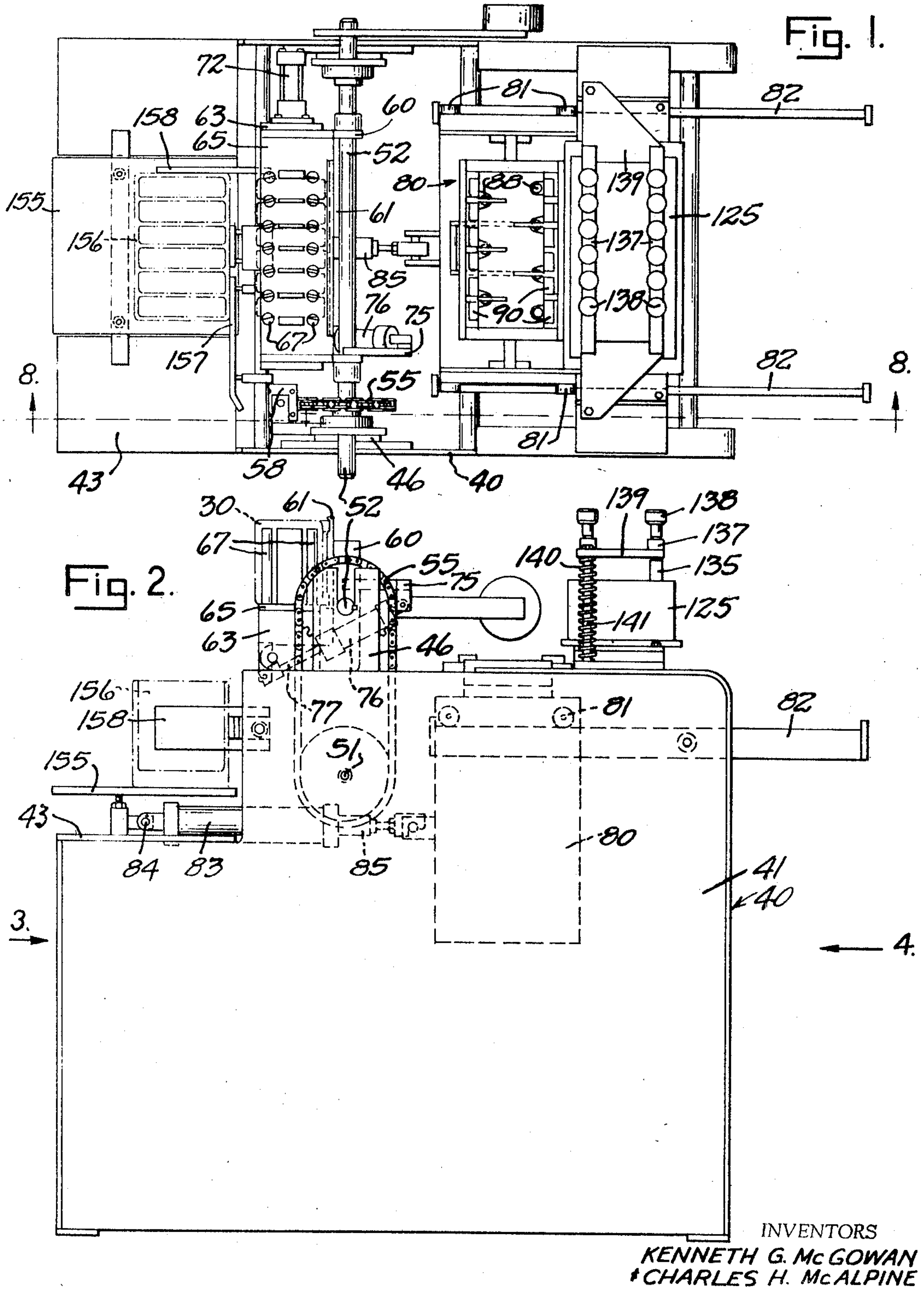
FIG. 1 is a top plan view of the apparatus.
FIG. 2 is a side view of the apparatus as viewed from the bottom in FIG. 1.
Figure 8:
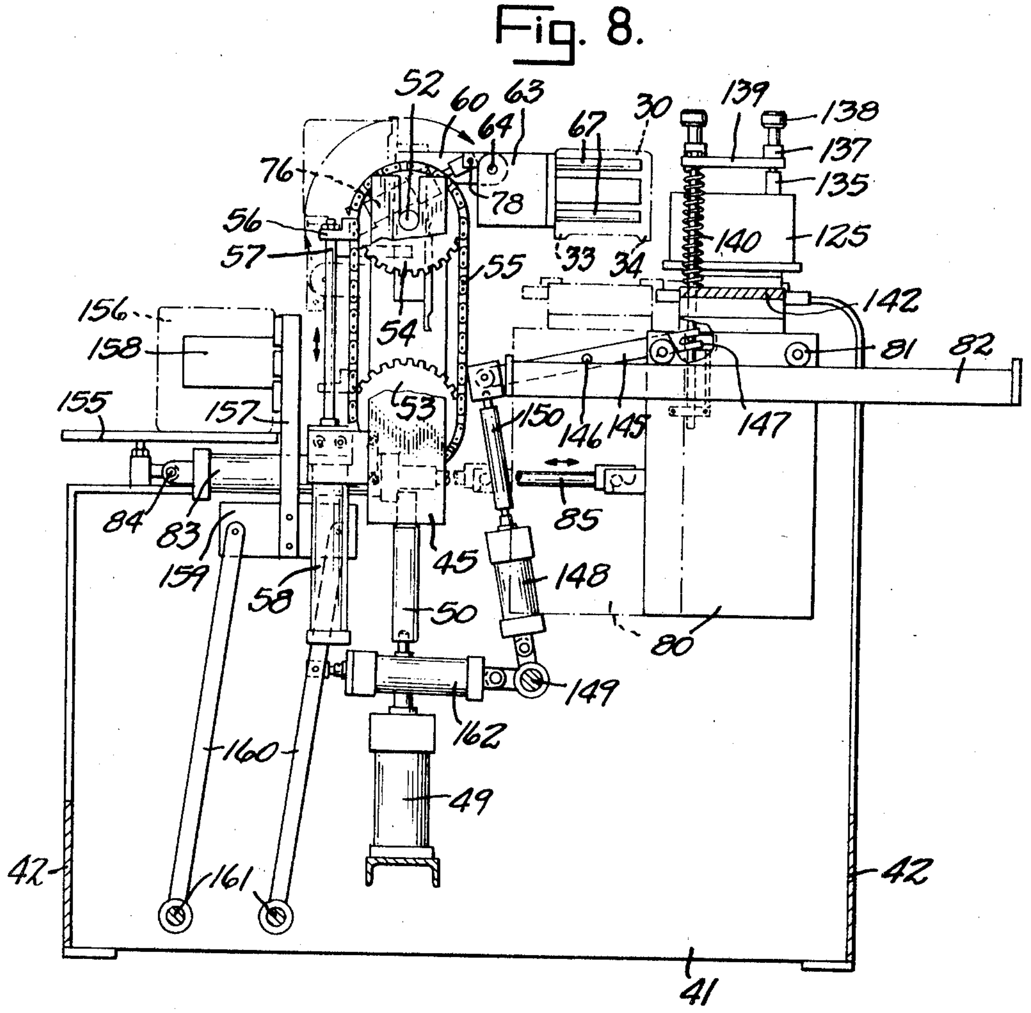
FIG. 8 is a longitudinal vertical sectional view taken on line 8—8 of FIG. 1.
Figure 9:
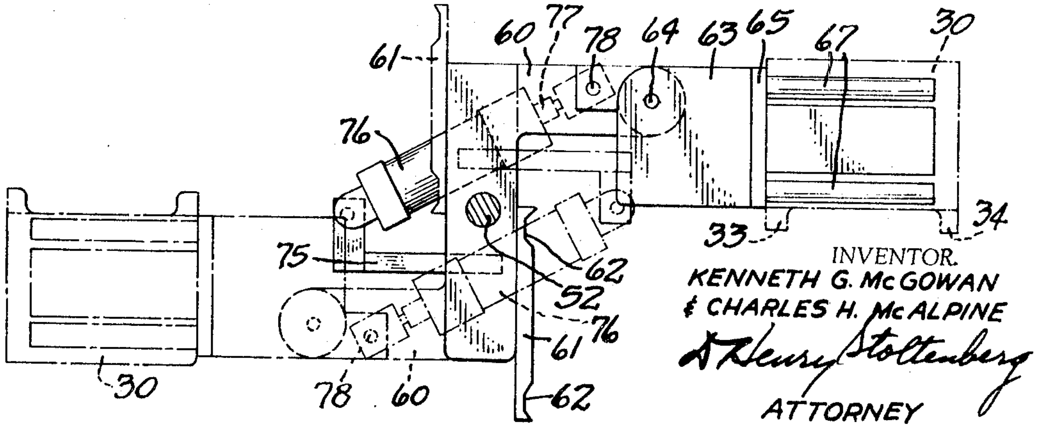
FIG. 9 is an enlarged detail view illustrating the means for controlling the position of the plate clamp relative to its carrier during operation of the device.

Means are provided for rocking each clamp assembly upon the L-shaped members 60. As shown in FIG. 9, a rigid projection 75 on one of the members 60 at the end thereof remote from the pivot 64 serves as a support for pivotally mounting a double-acting power member 76, such as a hydraulic cylinder having a piston rod 77 projecting therefrom and pivotally connected at 78 to the adjacent bracket 63 spaced from the pivot 64. FIGS. 1 and 2 illustrate the extended position of the power member 76 for positioning the clamp with its plate 65 substantially horizontal and the pin projections 67 extending vertically upwardly therefrom for loading. FIG. 8 and the full lines of FIG. 9 illustrate the power member 76 retracted to position the clamp pins 67 horizontally prior to the molding operation, and FIGS. 22, 24 and 25 and the dotted line position in FIG. 9 show the member 76 retracted during the unloading operation of the device.

Figures 10, 11:
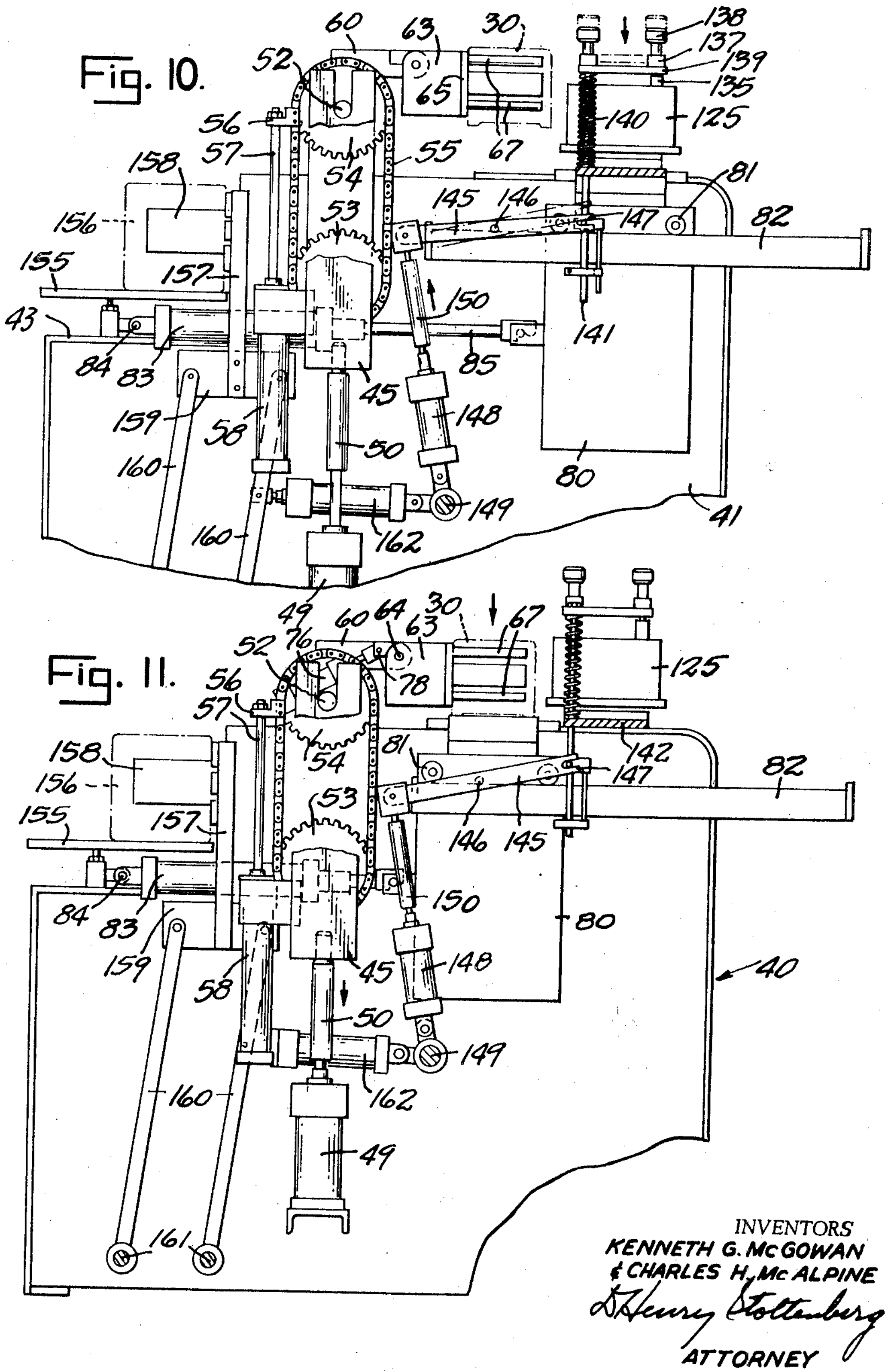
FIG. 10 is a fragmentary sectional view taken on line 8—8 of FIG. 1, and illustrating the parts in a mold-filling position.
FIG. 11 is a fragmentary vertical sectional view taken on line 8—8 of FIG. 1, and illustrating the parts of the apparatus in a molding position.
Figure 12:
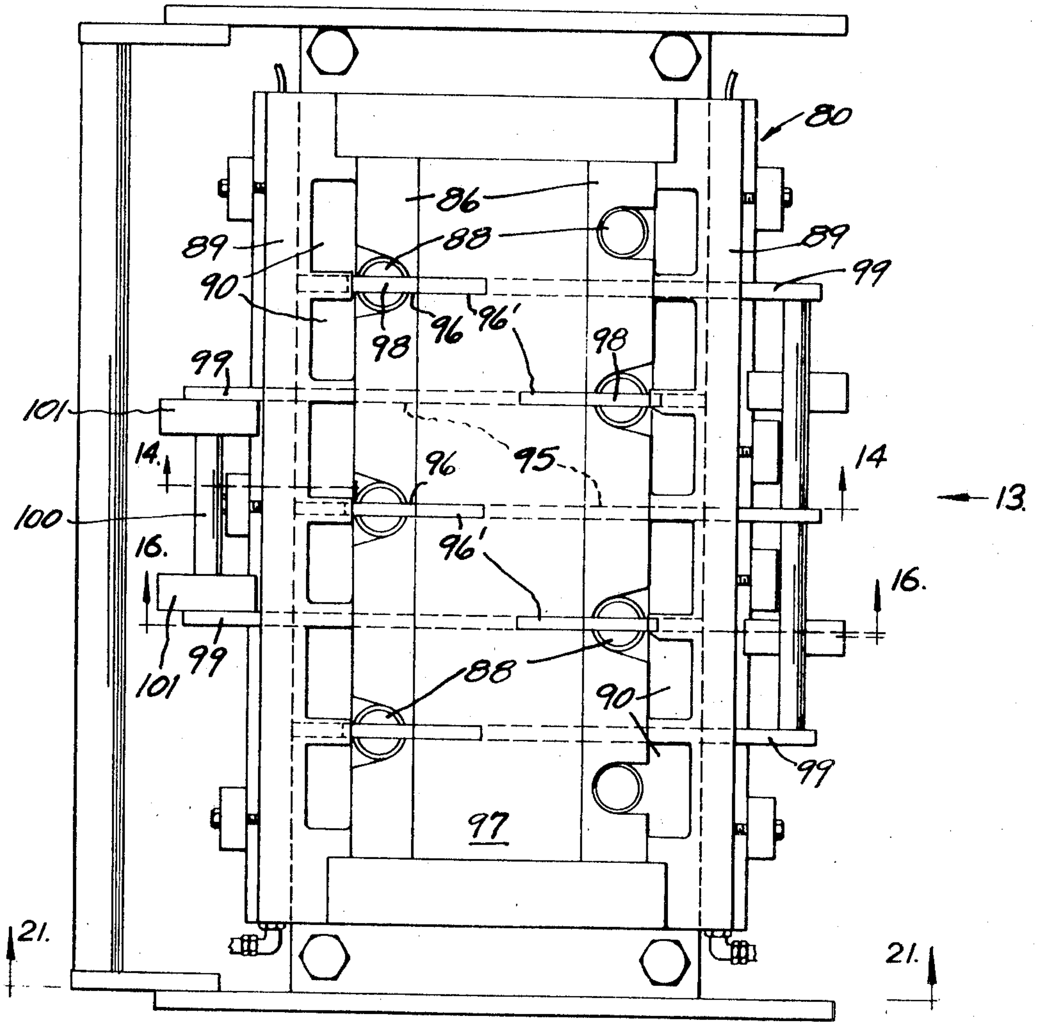
FIG. 12 is a top plan view of the molding section of the apparatus.
Figure 13:
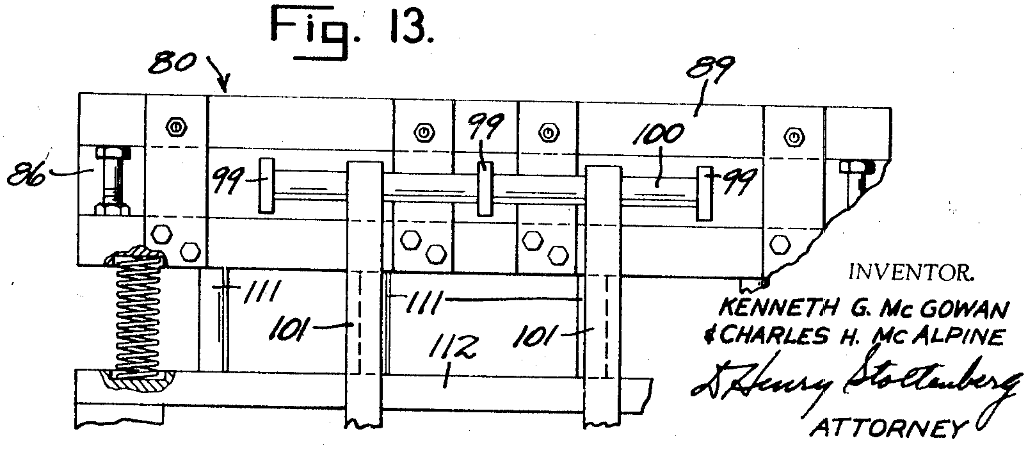
FIG. 13 is a fragmentary side view of the molding portion of the apparatus as viewed from the right in FIG. 12 and with parts shown in section.

A casting mold and knock-out unit 80 is supported by rollers 81 to traverse horizontal longitudinal guides 82 carried by the frame. Unit 80 is shiftable between a mold-loading position, as illustrated in FIG. 10, and a molding or casting position as illustrated in FIG. 11, by means of a double-acting power member 83, such as a pneumatic or hydraulic cylinder, pivoted to the frame at 84 and having a piston rod 85 projecting therefrom and connected to the unit 80.

Figure 14:
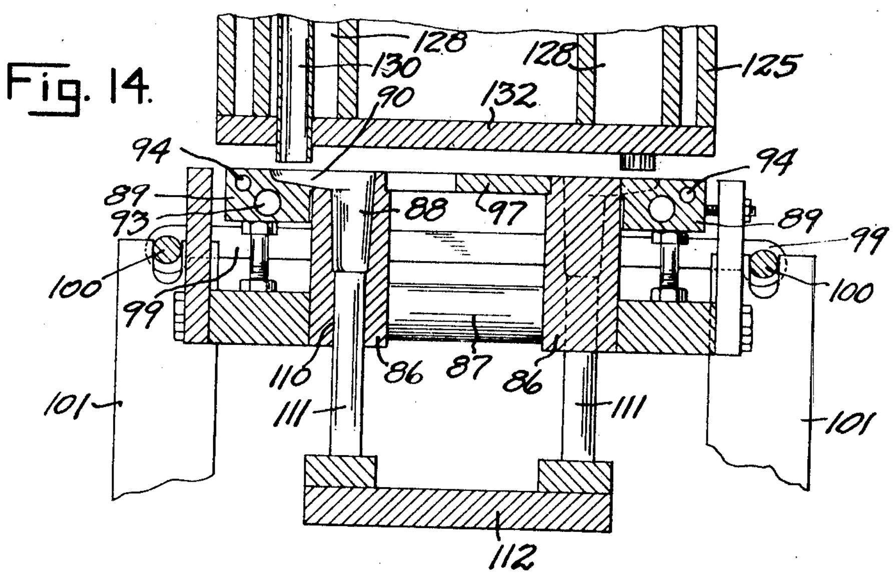
FIG. 14 is a fragmentary vertical sectional view taken on line 14—14 of FIG. 12.
Figure 15:
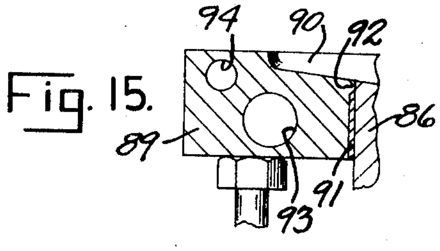
FIG. 15 is an enlarged detail sectional view of a portion of the mold taken on line 14—14 of FIG. 12.

The mold 80, as best seen in FIGS. 12–17, has a pair of elongated mold members 86 rigidly interconnected in spaced relation by cross bars 87. Each mold member 86 has a plurality of deep molding cavities 88 formed therein. A pair of rails 89, preferably formed of aluminum, extend along the outer sides of the mold members 86, and each has a shallow molding cavity 90 juxtaposed to and communicating with each of the molding cavities 88 in the adjacent rail 86. Cavities 90 are adapted to mold the connector straps 35 of the battery. As best seen in FIG. 15 the rails 89 are separated from the mold members 86 for the major portion of their extent by an insulator 91 for heat insulation and have contact with the mold members only at the narrow lands 92. Each rail 89 preferably has an elongated passage 93 therein to receive heating means, such as an electrical heating element, and also preferably has elongated passage 94 for flow of a cooling fluid therethrough.

Figure 16:
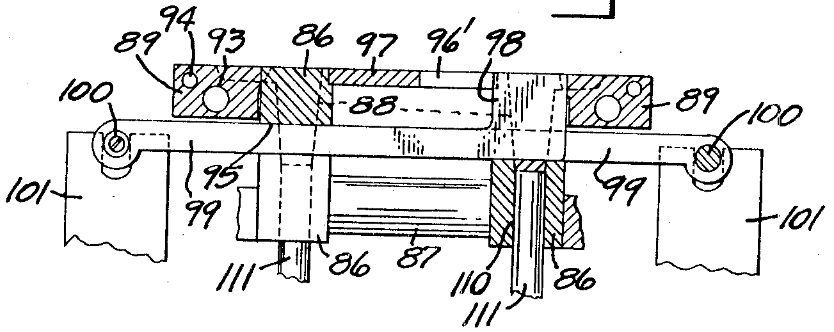
FIG. 16 is a fragmentary vertical sectional view taken on line 16—16 of FIG. 12 and illustrating core members in operative position.
Figure 17:
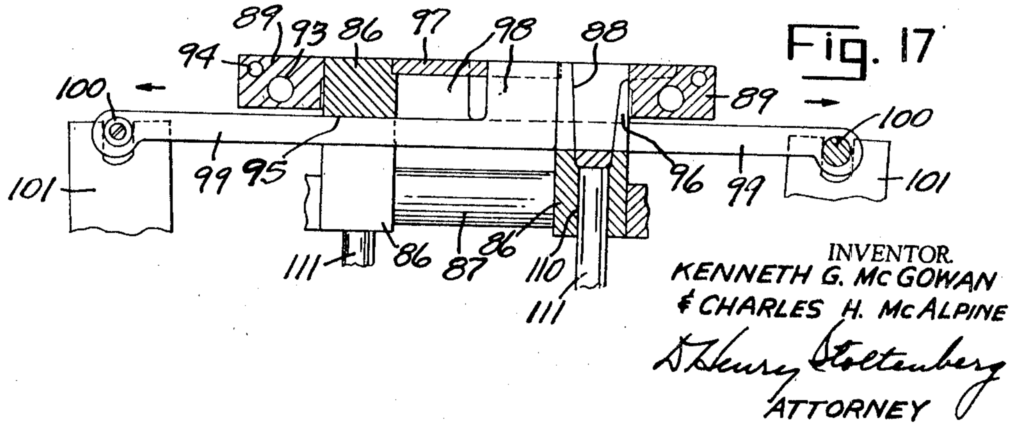
FIG. 17 is a vertical transverse sectional view taken on line 16—16 of FIG. 12 and illustrating the core members in released or inoperative position.
Figure 18:
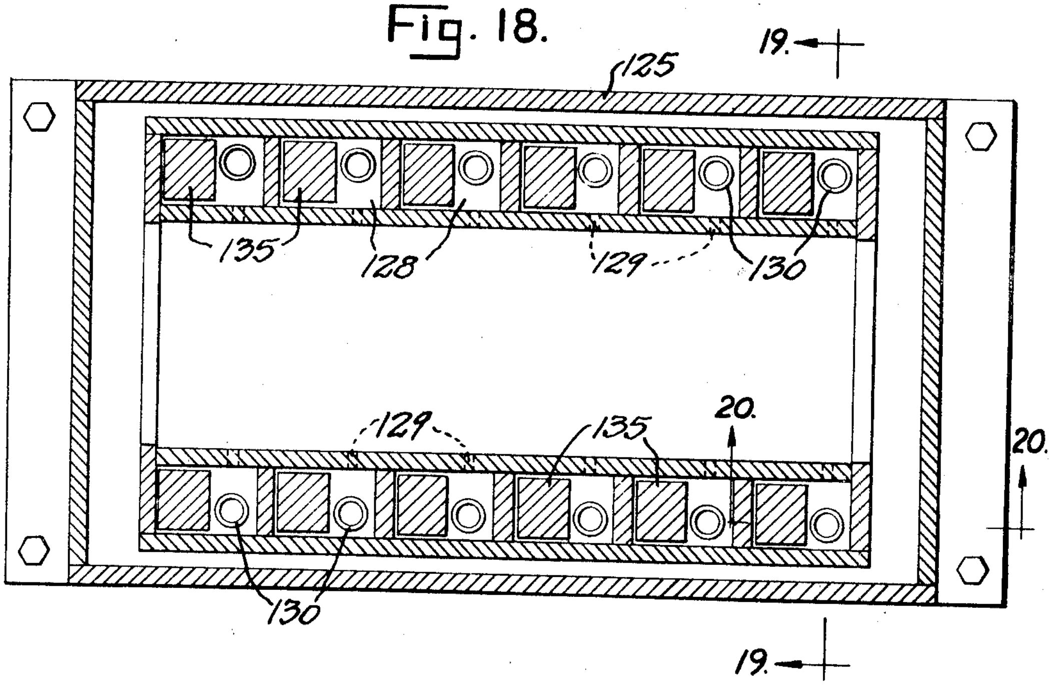
FIG. 18 is a horizontal sectional detail view of the mold-filling apparatus, taken on line 18—18 of FIG. 19.
Figure 21:
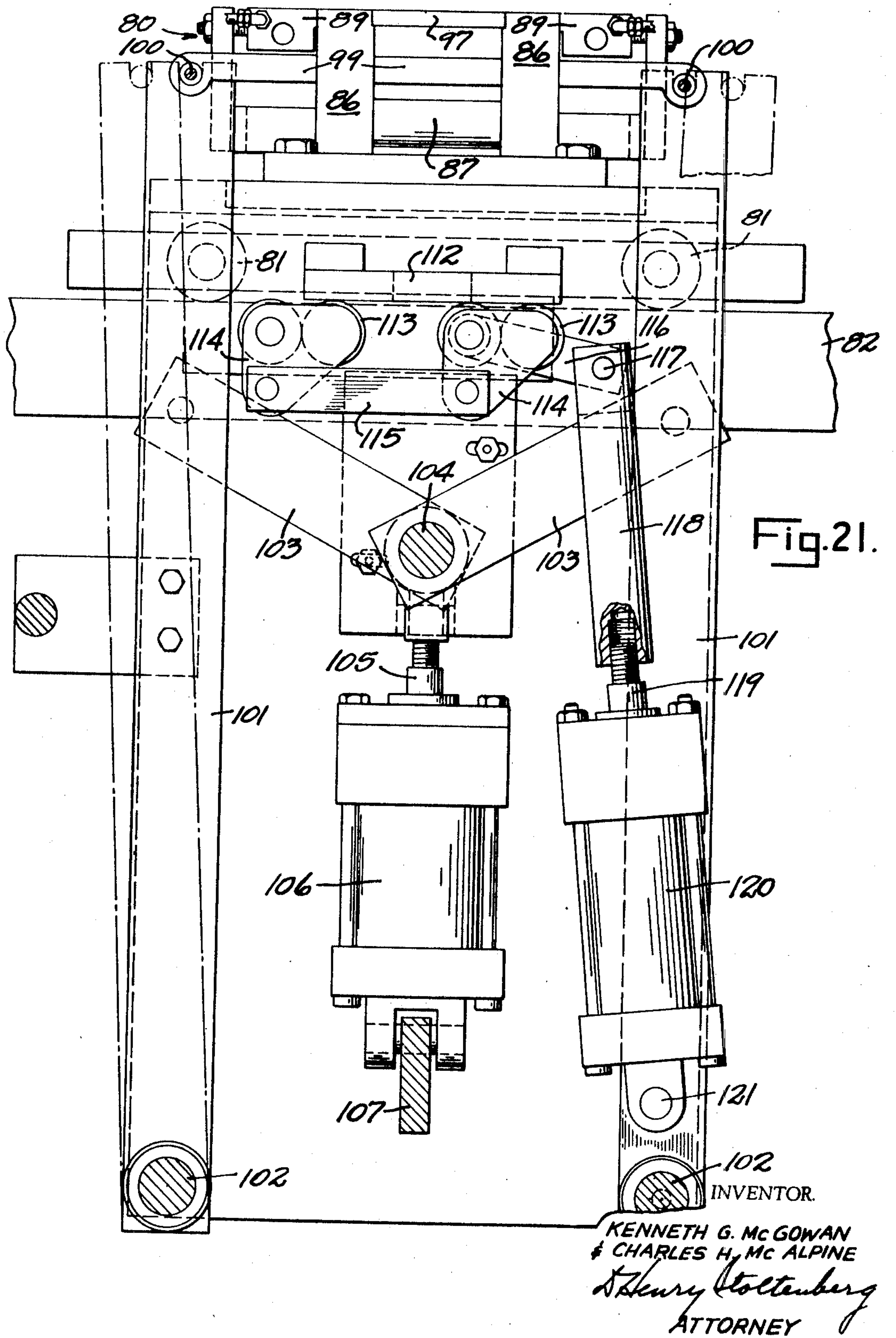
FIG. 21 is a fragmentary enlarged detail sectional view taken on line 21—21 of FIG. 12.

Each mold 86 has a plurality of transverse passages 95 therethrough, and at selected points transverse slots 96 extend through each mold 86 spaced from the passages 95 therein and in intersecting relation to a molding cavity 88 and in alignment with a passage 95 in the opposite mold member 86. A plate 97 extends between the mold members 86 with its upper end substantially flush with the top of the mold members, as best seen in FIG. 14, and slots 96' are formed in the plate 97 in alignment and register with slots 96. Passages 95 and slots 96 and 96' accommodate slidable movement of core plates 98 between an operative position, as illustrated in FIG. 16, and inoperative position as illustrated in FIG. 17. Each core plate 98 is mounted upon a bar 99 extending through passage 95 in the opposite mold member 86 and has connection with a crossbar 100 which has pivotal connection with the upper ends of elongated levers 101 extending substantially vertically and having slotted upper ends. The lower ends of levers 101 are pivoted to the frame at 102. Each of the levers 101 has a toggle link 103 pivotally connected thereto immediate its end and said toggle links are pivotally interconnected by a rod 104 to which is connected the piston rod 105 of a fluid pressure double acting power member 106 which in turn is mounted upon a fixed member 107 forming a part of the frame. It will be apparent that when the parts are in the position shown in FIG. 21, the levers will be in the full line pcsition with the core plates 98 in operative position. When the power member 106 is operated to elongate the same and swing the toggle links 103 upwardly, the levers 101 will be swung outwardly, thereby pulling the core plate bars 99 and the core plates 98 to the FIG. 17 position to withdraw the core plates 98 from the slot 96 in the mold members and into slots 96' and thereby free the parts within the mold cavities which were molded around the core plates when in the operative position illustrated in FIG. 16.

Suitable knockout means are associated with each cavity 88 of the mold. Thus each mold cavity has a bore 110 aligned therewith and projecting downwardly therefrom for reception slidably of a knockout pin 111. Knockout pins 111 are interconnected by a cross-plate 112 which is supported upon rollers 113 journaled upon bellcrank members 114 pivoted on the unit 80 and interconnected by a cross link 115. A lever 116 projects from one bellcrank and has pivotal connection at 117 with an extension member 118 having adjustable screw-threaded connection upon the piston rod 119 of a double-acting power member 120 of the fluid pressure type which is pivotally connected at 121 with a fixed part of the mold unit 80. It will be apparent that, upon actuation of power member 120 to pivot the bellcranks 114, the knockout pin crossbar 112 will be elevated to move the knockout pins 111 upwardly in the bores 110 and into the lower part of the mold cavities 88 in which the intercell connectors 36 have been molded.

Figure 4:
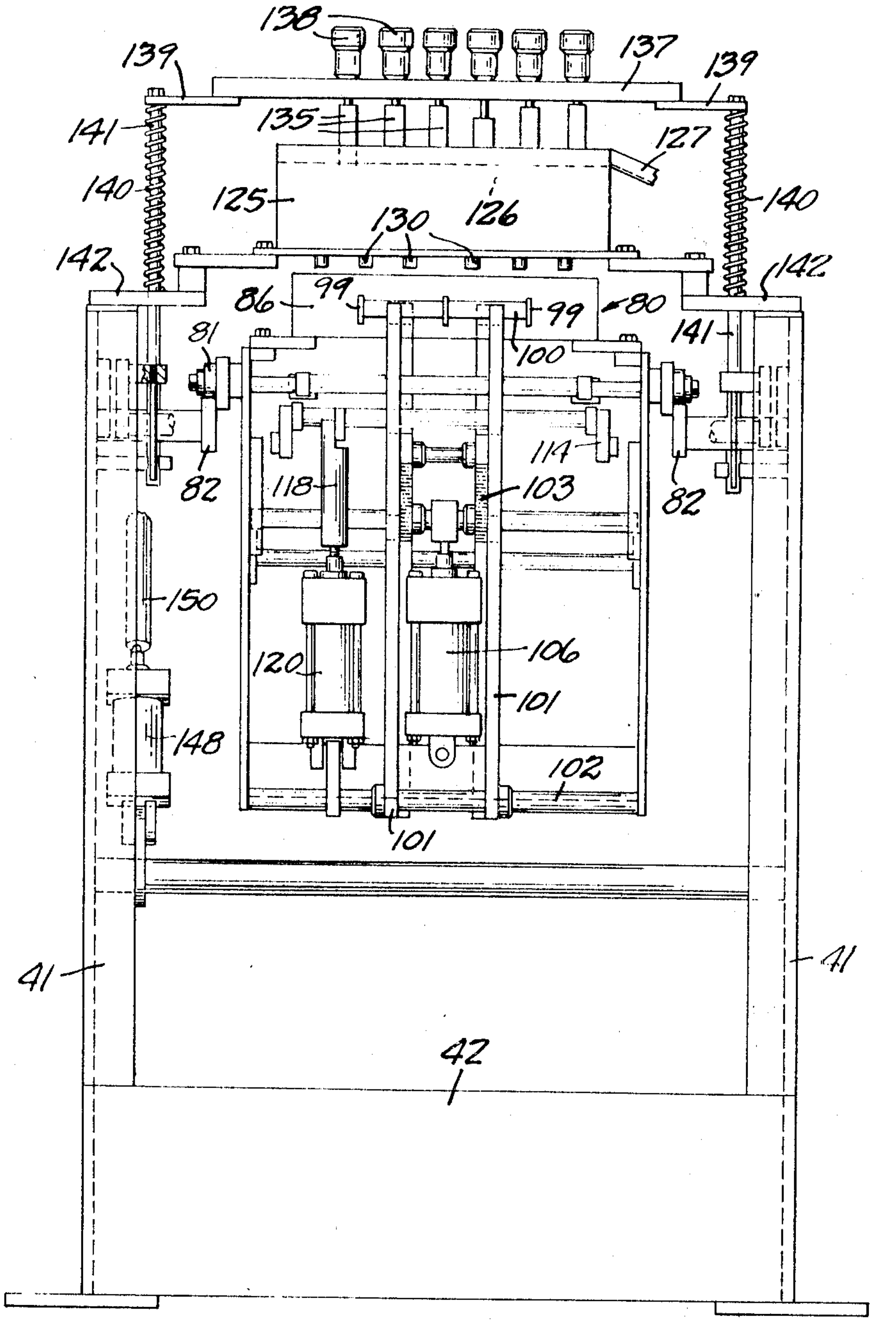
FIG. 4 is an end view of the apparatus as viewed from the right in FIG. 2.
Figures 19, 20:
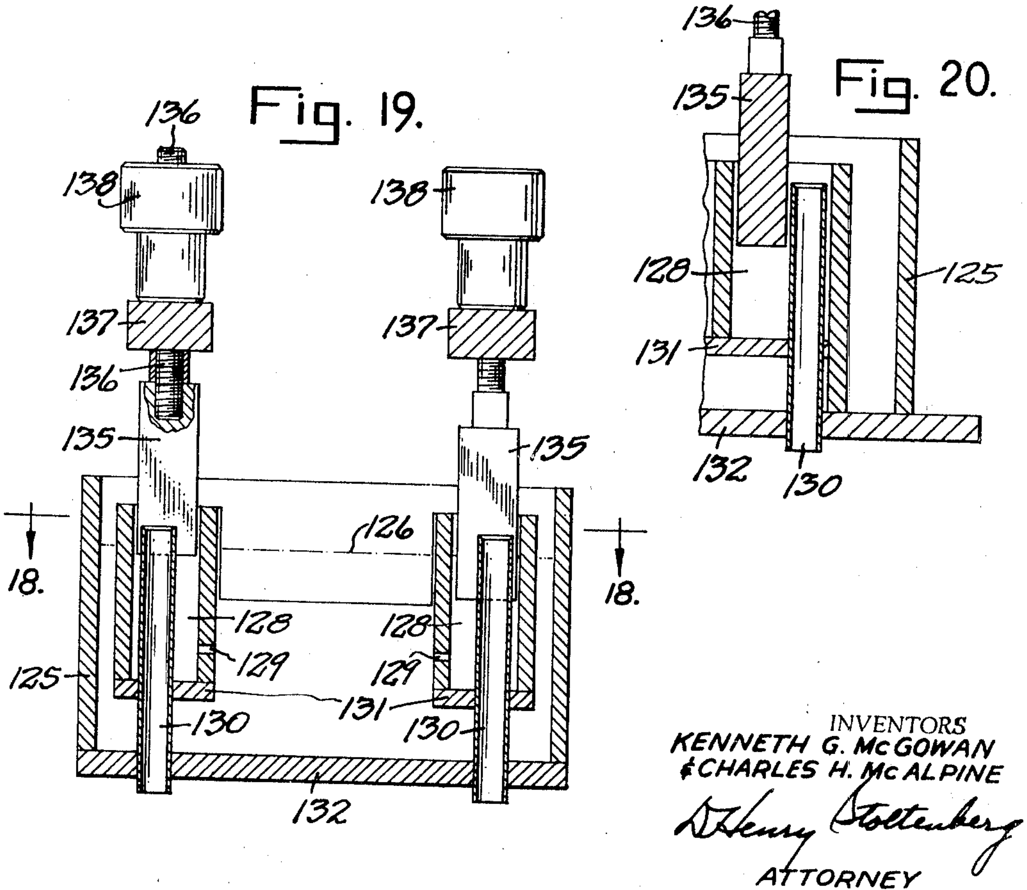
FIG. 19 is a vertical sectional view taken on line 19—19 of FIG. 18.
FIG. 20 is a fragmentary detail sectional view taken on line 20—20 of FIG. 18.

Mold filling means are carried by the upper part of the frame of the device in adjacent relation to the mold unit so as to be positioned thereabove when unit 80 is in the position illustrated in FIGS. 8, 10 and 14. The mold filling means constitutes a container 125 suitably supported upon the frame of the device at the rear thereof and adapted to contain molten lead at a predetermined level 126 therein as determined by the discharge level of an overflow member 127, as seen in FIG. 4. Two rows of lead supply measuring chambers 128 are provided in the container 125, with the upper level of each being above the level 126 of the lead in container 125. Each measuring chamber 128 has a restricted inlet port 129 (see FIG. 19) therein adjacent its lower end. An open ended tube 130 whose bore is larger than port 129 extends vertically in each chamber 128, passing through the bottom 131 thereof and through the bottom 132 of the container. A tube 130 is fixed in each chamber and its upper end terminates at a level spaced below the open upper end of each chamber and spaced above the level of the molten lead therein. The tubes 130 are so positioned that when the mold is located properly therebelow and lead flows therethrough, the lead will enter the shallow mold cavities 90 in which battery straps are molded.

This flow of lead through the tubes 130 is effected by vertical movement of lead displacement members 135, one of which is located in each of the chambers 128 and is shiftable vertically therein. The lead displacement members 135 have screw-threaded shank portions 136 projecting thereabove, each extending through a cross-bar 137 and mounting an adjusting nut 138 bearing on the top of the cross-bar. By this means the vertical position of each displacement member in its lead supply chamber can be adjusted. Thus by reference to FIG. 19, it will be observed that the left displacement member 135 shown therein is at a higher level than the the right displacement member 135, although the crossbars 137 are at the same level. The crossbars 138 are fixedly interconnected by member 139 and are positioned in elevated relation to the container 125 by coil springs 140 which encircle guide rods 141 secured to the connectors 139 and slidable in frame members 142. A lever 145 is pivoted to the frame at 146 adjacent each guide rod 141 and has a slotted end 147 engaging a projection on the guide rod. A power member 148, such as a fluid pressure double-acting cylinder, is supported by a fixed member 149 carried by the frame and has a piston rod projecting therefrom and connected to the lever 145. The coil springs 140 bear upon the frame parts 142 to normally position the lead displacement members 135 in an elevated inoperative position.

Upon lowering of the displacement members 135, the level of the lead in each chamber 128 is raised to a level above the level of the upper end of the tube 130 thereof so that lead may flow through the tube 130 and into the molding cavity 90 therebelow. In this connection it will be apparent that the restricted size of the opening 129 will limit the flow of lead from each chamber therethrough incident to lowering of displacement member 135. Also it will be apparent that accurate measurement of the quantity of lead dispensed from each chamber can be effected by proper adjustment of the starting position of the displacement member 135 therein relative to the level of the molten lead. Thus, as viewed in FIG. 19, the down stroke of the left displacement member 135 will discharge a greater amount of molten lead from its chamber 128 than will be discharged by an equal downward movement of the displacement member 135 at the right in FIG. 19 which initially is at a lower position. This results from the fact that a greater quantity of molten lead is contained in the left chamber 128 in FIG. 19 than is contained in the right chamber in that figure.

The device is provided with a battery case carrier unit adjacent the loading end thereof. As here shown, this unit comprises a slotted horizontal plate 155 for supporting a battery case 156. An upright 157 mounts a backing plate against which the battery case is positioned to insure its proper location lengthwise of the frame of the device. A guide member 158, which may be adjustably mounted laterally upon the frame of the device, projects endwise of the frame of the device and is abutted by the end of the battery case, the two members 157 and 158 being properly oriented for the particular carrier clamp utilized in the device. Upright 157 is mounted upon a horizontal member 159 carried by elongated vertical parallel pivot arm 160 pivoted at 161 to the lower portion of the frame 40. A double-acting horizontally positioned extensible and retractable power member 162, such as a fluid pressure responsive member having a shiftable piston rod 163, is connected at one end to one of the pivot arms 160 and is pivotally mounted upon member 149 at its other end.

The device is provided with suitable control means (not shown) for providing sequential operation of the various power members to complete a cycle once operation of the machine is started. Alternatively, the various power members may be manually sequentially operated. In either event, the operating cycle for performance of the method is accomplished by the mechanism.

The starting position of the device is illustrated in FIGS. 1 and 2 where it will be seen that the clamp plate or support 65 is positioned horizontally, and the aligning plate 61 is positioned vertically and parallel to clamp pins 66 and the pin projections 67 are positioned above support 65 as illustrated in FIG. 5. The required set of positive and negative plates 30, 31 and separator sheets 32 for each cell is positioned upon the clamp plate 65 between each adjacent set of clamp pin projections 67 with the lugs 33 and 34 of the plates 30 and 31 so positioned that all lugs 33 are aligned and all lugs 34 are aligned. This alignment is insured by positioning the plates 30, 31 so that the lugs 33 and 34 thereof seat in the proper respective aligning grooves 62 of the aligning plate 61. When all of the groups or stacks of plates and separators required for the number of cells in the desired battery have been so positioned upon the clamp carrier, the power member 72 is actuated to rock or rotate the pin projections 67 from the free or released position illustrated in FIG. 5 to the clamping position illustrated in FIG. 7. The power member 72 is carried by the clamp unit and moves therewith and serves to maintain the plates and separators in the selected position during the succeeding parts of the operating cycle.

Figure 22:
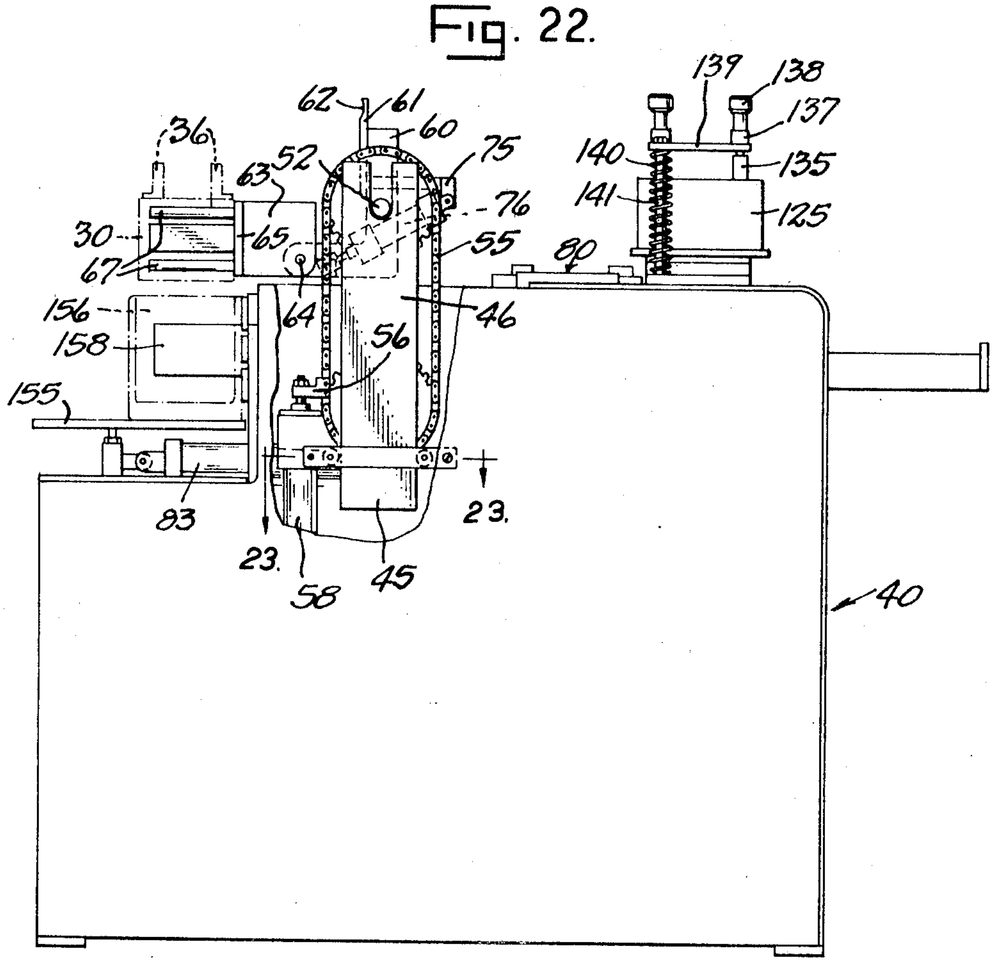
FIG. 22 is a view of the device in side elevation with parts broken away, in a position immediately preceding discharge of the assembled and interconnected plates to a battery casing.

During the loading operation the clamp carrier 45 will preferably be positioned by power member 49 at its uppermost position and the chain 55 of the clamp carrier will be positioned by its power member 58 at the position illustrated in FIG. 22 wherein the chain lug 56 connected to the piston rod 57 of the power member is at the lower end of one run of the chain. After the plates 30, 31 and separators 32 have been firmly clamped by the pin projections 67, power member 58 is energized to shift the chain to the position illustrated in FIGS. 8, 10 and 12. The power member has a stroke of a length to provide rotation of the shaft 52 through 180 degrees thereby swinging the L-shaped members 60 and the alignment plate 61 from the position shown in dotted lines in FIG. 9 to the position shown in full lines in FIG. 9. At the same time that the power member 58 is actuated, the power member 76 is actuated. During loading the power member 76 was positioned as shown in dotted lines in FIG. 2 with its piston rod extended. The energization of power member 76 during the rocking of shaft 52 contracts or retracts the piston rod 77 to the position illustrated in FIGS. 8 and 9. Thus by the time the conjoint action of the power members 58 and 76 has been completed, the clamp and the battery plates and separators have been swung from the position shown in FIG. 2 to that shown in FIG. 8, in which the battery plates are located adjacent to the filling container 125 with the battery lugs 33 and 34 projecting downwardly.

In properly timed relation to the operation of the power members 58 and 76, the power member 83 may be energized to shift the casting unit 80 from its casting position, illustrated in FIG. 11, to its filling position illustrated in FIG. 10. After casting mold 80 has reached the position illustrated in FIGS. 8, 10 and 14, and assuming that chambers 128 contain molten lead, the power member 148 is energized to depress or lower the connector 139 and the crossbars 137 and the lead displacement members 135. Movement of the lead displacement members 135 downwardly causes ejection of a measured quantity of lead from each lead-supply measuring chamber 128 through the tube 130 and into the molding cavities 88, 90. After a measured quantity of molten lead is thus fed to each of the molding cavities 88, 90, the power member 148 is de-energized to permit springs 140 to elevate the displacement members 135, and the power member 83 is operated to shift the loaded casting mold 80 from the full line position shown in FIG. 8 to the dotted line position shown in that figure.

As soon as the loaded casting mold reaches the position shown in dotted lines in FIG. 8 below the plate clamp 65, 67 and the plates 30, 31 carried thereby the power member 49 is energized to lower the clamp carrier 45 from the position shown in FIG. 8 to that shown in FIG. 11, in which position the lugs 33 and 34 of the battery plates are immersed in the molten lead in the strap molding cavities 90. This operation may entail immersion to the selected depth, or as mentioned previously, may entail initial immersion to a slightly greater depth than desired, followed by elevation to the selected depth. The molten lead is maintained in molten condition between the mold-filling operation and the lug-immersing operation by the heating means in the passages 93 of the mold if that is required. When the battery plate lugs have been immersed in the molten lead in the cavities 90, the heating means in passages 93 may be deenergized and cooling material may be caused to flow through the passages 94 to accelerate solidification of the lead in the molding cavities 88 and 90.

Prior to and during the time that the mold 80 is positioned below the loading container 125, i.e., in the position shown in FIG. 10, the power member 106 is actuated to pull downwardly upon the toggle links 103 and inwardly upon the levers 101 for the purpose of positioning the core plates 98 and the core plate bars 99 in the position shown in FIG. 16, wherein the core plates 98 are positioned in the slots 96 to extend across or span the molding cavities 88. The power member 106 holds the core plates 98 in this position while the filled mold 80 is shifted to the FIG. 11 position and the battery plate clamp is lowered to immerse the lugs 33 and 34 in the molten lead and until such time as the molten lead has solidified, as can be determined by suitable thermostatic or temperature measuring means (not shown). Thereupon, power member 106 is energized to elevate the toggle pivot rod 104 and spread the toggle links 103 and the levers 101 to pull the core plates clear of the molding cavities 88 to the position shown in FIG. 17.

The solidified lead which forms the straps 35, the cell interconnectors 36 of arched or slotted character, and the terminal posts 37, is then freed from the mold by energizing the knockout power member 120 to swing the bellcranks 114 and elevate the rollers 113 and the cross plate 112 carrying the knockout pins 111. Coincidentally with the operation of the power member 120, or shortly thereafter, the power member 49 is operated to elevate the clamp carrier for return to the position shown in FIG. 10. Thereupon, the assembly of the connector straps, cell interconnector means and terminal posts with the battery plates, will have been completed and a complete insert ready for insertion in a battery case is provided.

Figures 24, 25, 26:
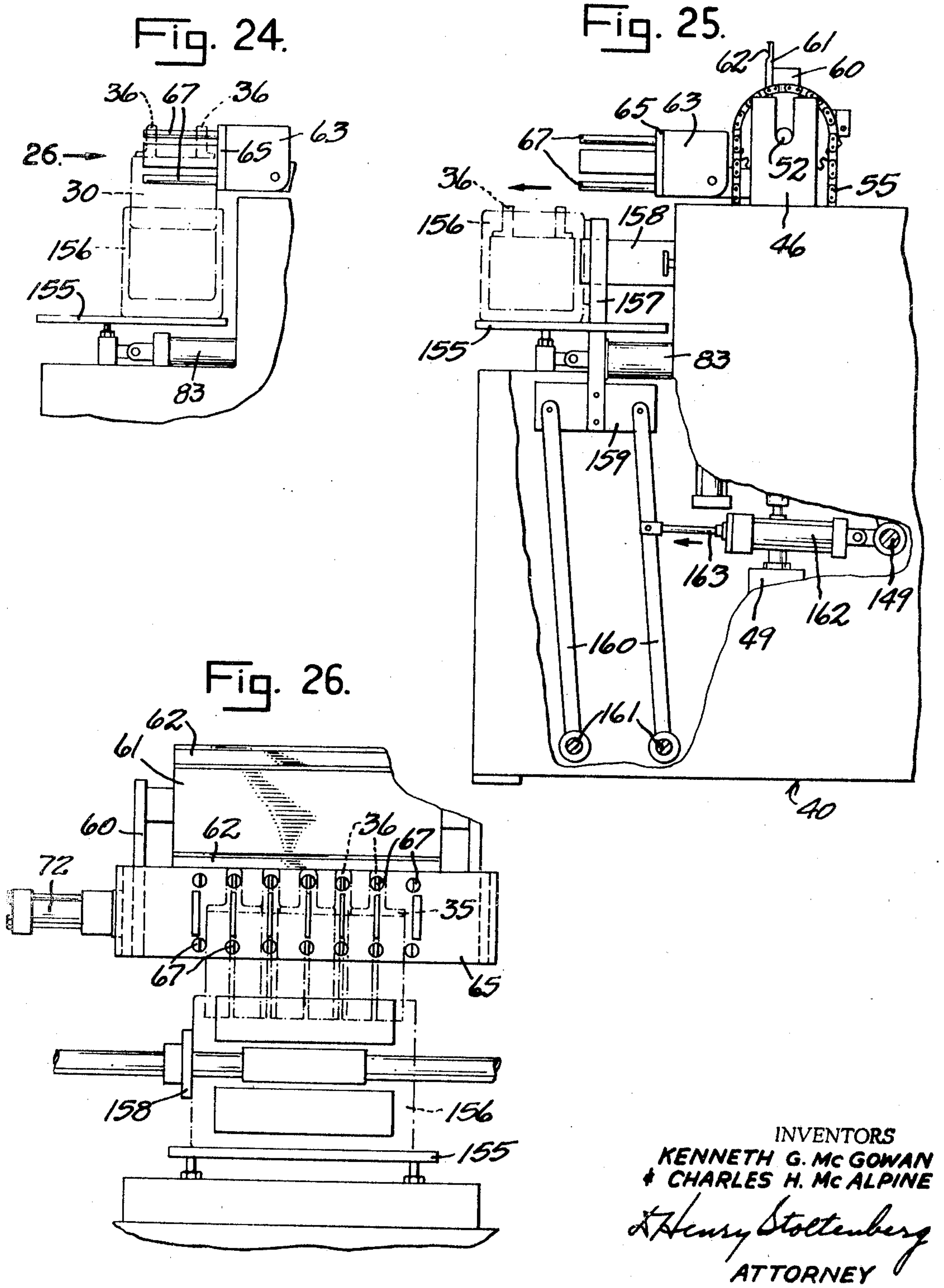
FIG. 24 is a fragmentary side view of the device illustrating the plate carrier in release position for initial discharge of interconnected plates into a battery casing.
FIG. 25 is a fragmentary side view with parts broken away, illustrating the delivery of the loaded battery casing from a plate receiving station to a discharge position.
FIG. 26 is a fragmentary end view of the device as viewed from the left in FIG. 24, illustrating discharge of the plates into the battery casing.

This assembly is then swung to the position illustrated in FIG. 2 by the operation of the power member 58. During this operation, the parts move from the full line position shown in FIG. 9 to the dotted line position shown in FIG. 9. When the parts reach the position shown in FIG. 22, the battery case 156 will be mounted upon its support in the position shown in FIGS. 10 and 11 directly beneath the battery plate assembly to receive the lower ends of the assembly. Power member 72 is then energized to rock the clamping fingers 67 from the FIG. 7 clamping position to the FIG. 5 releasing position, thereby permitting the assembly to drop partially into the battery case 156, as illustrated in FIG. 24, until the arched intercell connectors 36 rest upon the uppermost finger projection 67. At this time the lowermost parts of the battery plates 30, 31 and their separators will project into the upper part of the battery case 156. Thereupon, the power member 162 may be energized to shift the battery case upon the supporting plate 155 toward the left from the position shown in FIG. 24 to that shown in FIG. 25, moving with it the battery plate assembly until the intercell connectors 36 slide clear of the plates 67, thereby permitting the battery plate assembly to fall into the case 156 in proper position with the intercell connectors 36 straddling the transverse walls of the battery case which separate the different cells of the battery case.

At this point the operator removes the assembled battery case and its contents and replaces another battery case 156 while the power members 49, 76 operate to move the clamp from the position shown in dotted lines in FIG. 9 to the starting position shown in FIG. 2.

While the preferred form of apparatus embodying the invention is illustrated and described, it will be understood that changes in the construction may be made within the scope of the appended claims.

We claim:

1. Apparatus for casting intercell connectors for batteries wherein positive and negative plates are arranged with lugs projecting there from in different rows, comprising means for clamping said plates and intervening separators in a plurality of groups arranged in the relation thereof required in a multiple cell storage battery, a casting mold having a plurality of cavities cooperating with the lugs of adjacent cell groups arranged and shaped for casting straps and intercell connectors required for said battery, means for filling the cavities of said mold with molten metal, and a clamp carrier for shifting said clamp means between different stations including a station at which said plate lugs are immersed in the molten metal in said mold.

2. Apparatus as defined in claim 1, wherein said clamp carrier includes means for swinging said clamping means to different angular positions, and means for shifting said clamping means to different elevations.

3. Apparatus as defined in claim 1, wherein said casting mold shiftably mounts core plates each adapted to span the upper part of an intercell connector cavity, and means for withdrawing said core plates from said mold cavities.

4. Apparatus as defined in claim 1, wherein said mold has a pair of aligned slots at opposite sides of the upper part of each intercell connector cavity and a core plate is shiftable endwise in the slots of each pair between a position spanning a cavity and a position clear of said cavity.

5. Apparatus as defined in claim 1, wherein said clamp means is rockable to different angular positions upon said carrier, and said carrier includes alignment means engageable by said lugs in one angular position of said clamp means on said carrier.

6. Apparatus as defined in claim 1, wherein said clamp carrier includes a member shiftable vertically to different elevations, a second member pivoted on said first member, means for pivoting said second member, said clamp means being pivotally connected to said second member, and means for pivoting said clamp means on said second member.

7. Apparatus as defined in claim 1, wherein said clamp means includes a battery plate support, a plurality of spaced substantially parallel pins journaled in said support and having parts of non-circular cross-section projecting from said support, each group of plates and separators being disposed between a pair of said projecting pin parts, and means for rotating said pins between rotative positions for respectively clamping and releasing said groups.

8. Apparatus as defined in claim 1, wherein said clamp means includes a battery plate support, two spaced groups of pins journalled in said support in similarly spaced substantially parallel relation and each including a part of non-circular cross-section projecting from said support, each group of plates and separators being disposed between adjacent pins in both groups, and means for simultaneously and equally rotating said pins between a clamping and a releasing position.

9. Apparatus as defined in claim 1, wherein said mold filling means constitutes a plurality of chambers containing molten metal and each adapted to be positioned above a predetermined mold cavity during filling of said mold, a discharge conduit having an upper open end located above the level of metal in each chamber, and a displacement member shiftable vertically in each chamber to raise the level of metal in each chamber above the upper end of each discharge conduit.

10. Apparatus as defined in claim 1, wherein said mold filling means constitutes a container of molten metal having a plurality of measuring compartments therein, inlet means at the lower part of each compartment below the level of said molten metal, a discharge conduit in each chamber having an upper open end above the level of said molten metal and normally elevated vertically shiftable displacement means in each compartment adapted to be lowered to elevate the liquid level in said compartment above the upper end of said conduit, said conduit having a bore larger than said inlet means.

References Cited

UNITED STATES PATENTS

| | | | |
|---|---|---|---|
| 1,274,016 | 7/1918 | Disinger | 164—333 |
| 2,542,503 | 2/1951 | Galloway | 164—251 |
| 2,625,897 | 1/1953 | Mann et al. | 164—333 |
| 2,799,905 | 7/1957 | Vieth | 164—333 X |
| 3,253,306 | 5/1966 | Sabatino et al. | 164—109 X |
| 3,395,748 | 8/1968 | Tiegel | 164—108 X |

J. SPENCER OVERHOLSER, Primary Examiner

R. S. ANNEAR, Assistant Examiner

U.S. Cl. X.R.

164—337